United States Patent [19]

Butenop

[11] Patent Number: 4,461,434

[45] Date of Patent: Jul. 24, 1984

[54] SELF-LOCKING BELT REELING MECHANISM FOR BUCKLE-ON SAFETY BELTS IN PASSENGER-CARRYING VEHICLES

[75] Inventor: Klaus Butenop, Herzhorn, Fed. Rep. of Germany

[73] Assignee: Autoflug GmbH, Rellingen, Fed. Rep. of Germany

[21] Appl. No.: 375,821

[22] Filed: May 7, 1982

[30] Foreign Application Priority Data

May 9, 1981 [DE] Fed. Rep. of Germany ....... 3118437

[51] Int. Cl.$^3$ ...................... A62B 35/02; B65H 75/48
[52] U.S. Cl. ............................................ 242/107.4 B
[58] Field of Search ................ 242/107.4 B, 107.4 A, 242/107.3; 280/806; 188/82.77, 135, 138; 297/478, 480

[56] References Cited

U.S. PATENT DOCUMENTS 3,410,153 11/1968 Merna, Jr. ................ 242/107.4 B X
3,416,747 12/1968 Stoffel .......................... 242/107.4 B
3,698,657 10/1972 Kirchoff ....................... 242/107.4 B
4,168,810 9/1979 Sack et al. ................ 242/107.4 B X

FOREIGN PATENT DOCUMENTS 7425531 6/1975 Fed. Rep. of Germany .

Primary Examiner—John M. Jillions
Attorney, Agent, or Firm—Becker & Becker, Inc.

[57] ABSTRACT

A self-locking belt reeling mechanism for buckle-on safety belts, particularly safety belts in motor vehicles. The mechanism has a spindle which is mounted in a housing, is subjected to spring tension, and on which the belt can be rolled up, and an inertial locking member which is eccentrically mounted on one end of the spindle and which, in the event of a predetermined acceleration in the rotation of the spindle in the direction of unrolling of the belt, moves outwards and makes contact with stops in the form of a ring of teeth integral with the housing. The locking member has a curved recess with at least one further stop, into which recess engages an attachment provided on the end of the spindle. This attachment acts as a stop for the locking member during any relative movement between the spindle and the locking member. The eccentric point for the eccentric mounting of the locking member is arranged at least on the circumferential line of the spindle, preferably outside this line. The attachment provided on the end of the spindle, and the locking member mounted thereon with its curved recess, have guide surfaces which are portions of circles drawn about the eccentric point, so that the locking member is guided only along the circular tracks thus formed. In a plastics spindle with a steel core, the steel core may comprise, in the region of mounting of the locking member, a perforation in which at least one cam of the locking member engages, so that it is prevented from moving in the direction of the spindle axis.

13 Claims, 6 Drawing Figures

SELF-LOCKING BELT REELING MECHANISM FOR BUCKLE-ON SAFETY BELTS IN PASSENGER-CARRYING VEHICLES

The present invention relates to a self-locking belt reeling mechanism for buckle-on safety belts in passenger-carrying vehicles, and has a spindle mounted in a housing and subjected to spring tension, on which the belt can be rolled up, and an inertial locking member which is eccentrically mounted on one end of the spindle and which, in the event of a predetermined acceleration in the rotation of the spindle in the direction of unrolling of the belt, moves outwards and makes contact with stops integral with the housing, said locking member having a curved recess with at least one further stop, into which recess engages an attachment provided on the end of the spindle, this attachment acting as a stop for the locking member during any relative movement between the spindle and the locking member.

A self-locking belt reeling mechanism of this kind is known from German Pat. No. 14 56 115. The locking member is constructed as a substantially circular, neutrally mounted disc which has an imbalance. The imbalance of the circular locking member is provided by cutting a section out of the locking member. The known belt reeling mechanism has the advantage that it can be produced with a minimum number of parts and therefore also has only a few bearing and friction points, which is of benefit to the reliability of the apparatus, and hence to the safety of the wearer. The individual parts are guided comparatively loosely against one another. Because of the ruggedness of this construction, individual components may be produced by simply stamping them out. The principle of the known belt reeling mechanism has proved satisfactory in practice and has been modified and developed considerably in the course of time.

In the known belt reeling mechanism, the curved recess in the locking member essentially describes, with its outer periphery, the path of an involute, but the curved recess embraces only part of the involute and is approximately half-moon-shaped, with dimensions which correspond to the cross section of the spindle attachment when this attachment is moved from one end position to the other in the half-moon-shaped portion of the recess. This provides a sufficiently large abutment surface in the locking position of the spindle attachment and locking member. However, the load on the spindle, and the relatively large angle through which the locking member has to travel before engaging in the stops on the housing, which are preferably in the form of teeth, are less favorable. German Utility Model No. 74 25 531, belonging to the assignee of the present invention, discloses an improvement in which two stops are provided, and the angle in question is smaller. The radial action principle of the prior art referred to above is not altered.

It is an object of the present invention to provide a self-locking belt reeling mechanism of the kind described, wherein more than two stops are provided on the spindle attachment for the locking member, and the angle through which the locking member has to pass before engaging is particularly small, thus permitting very rapid locking of the belt reeling mechanism. At the same time, the simple structure of the design according to the prior art should be retained.

These objects, and other objects and advantages of the present invention will appear more clearly from the following specification in connection with the accompanying drawings, in which.

Figure 1:
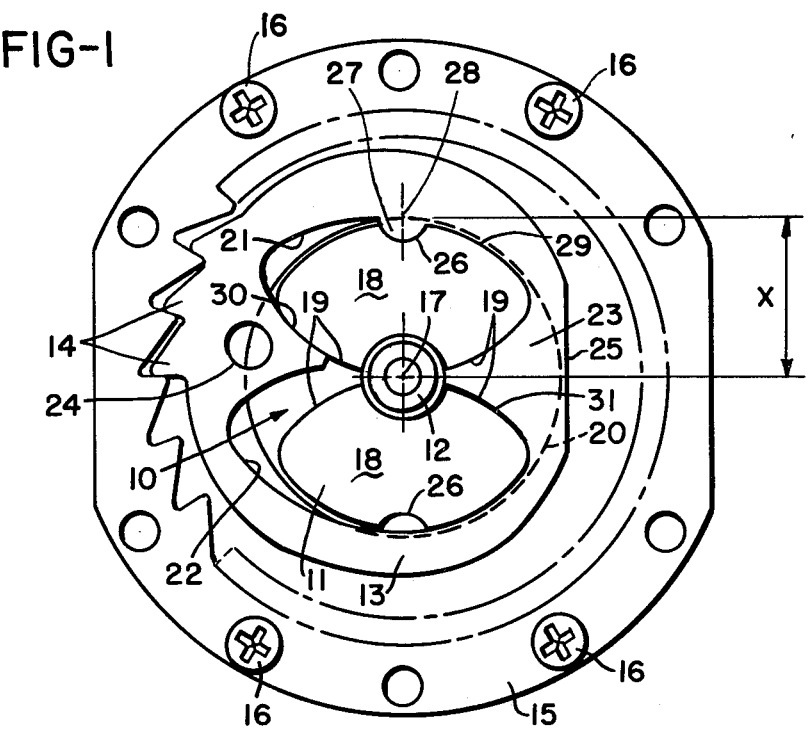
FIG. 1 is a view of the so-called system end of a self-locking belt reeling mechanism, without a housing, in the blocking position.

The belt reeling mechanism of the present invention is characterized primarily in that the eccentric point for the eccentric mounting of the locking member is arranged at least on the circumferential line of the belt winding spindle, preferably outside it; and the attachment provided on the end of the spindle, and the locking member mounted thereon with its curved recess, have guide surfaces which are portions of circles drawn about the eccentric point, so that the locking member is guided only along the circular tracks thus formed.

According to specific features of the present invention, the attachment may comprise two ovals of octagonal configuration mounted on each side of the spindle axis, the circumferential surfaces of which form the circular tracks mentioned above; the curved recess of the locking member may be designed to fit over the attachment and its circular surfaces, with the clearance required for the outwardly directed relative movement between the spindle and the locking member, with the eccentric mounting of the locking member being located in the region of an apex of the attachment. The attachment, located on the end of the spindle, may have a symmetrical butterfly-shaped configuration. The spindle attachment may be designed, at both apex points, for the selective mounting of the locking member. The spacing between the apex points of the spindle attachment may be substantially equal to the spindle diameter. The eccentric mounting of the locking member on the apex of the spindle attachment may be in the form of a depression in the spindle attachment, and a corresponding bearing projection in the recess of the locking member.

The spindle, which is subjected to spring tension and on which the belt can be rolled up, may comprise a steel core with a flat rectangular cross section, and a reel member made of plastics and containing the steel core; the attachment located on the spindle end, on which the locking member with its curved recess is mounted, may comprise a combination of portions of the steel core and the associated end face of the reel element, which together form the guide surfaces for forming the portions of circles drawn about the eccentric point.

The portion of the attachment formed by the steel core may cooperate with those parts of the curved recess in the locking member which, in the event of engagement of the locking member in the stops integral with the housing, serve to transmit force from the spindle via the locking member to the stops integral with the housing, while the portion of the attachment formed by the reel member may cooperate with those parts of the curved recess in the locking member which are intended to guide the locking member in its outwardly directed relative movement and back again.

The composite attachment may be approximately mushroom-shaped, with the head of the mushroom being on one side of the spindle axis and the stalk being on the other side of the spindle axis; the steel core may extend diagonally from the mushroom head to the stalk while forming an outer edge on both the mushroom head and the mushroom stalk, with the circumferential surfaces of the mushroom head forming the above mentioned circular tracks; the curved recess in the locking member may be designed to fit over the attachment with the mushroom head and stalk with the clearance required for the outwardly directed relative movement.

The eccentric mounting of the locking member may be produced by a depression in the mushroom head of the attachment and a corresponding bearing projection in the recess of the locking member, with the depression constituting a circle drawn about the eccentric point.

On the stalk portion of the mushroom-shaped attachment, opposite the abutment surface formed by the steel core, there may be provided an abutment surface formed by the reel member and made of plastics; in conjunction with a corresponding abutment surface of the curved recess of the blocking member, this abutment surface limits the inwardly directed relative movement of the locking member.

The steel core, in the area of mounting of the locking member on the attachment, may comprise at least one perforation in which at least one cam engages, this cam being located on the curved recess of the locking member, so as to prevent the locking member from moving in the direction of the spindle axis. Two cams may be provided, which are arranged opposite each other on each side of the spindle axis and engage from opposite sides in the perforation in the steel core. The two cams may be mounted at that point of the constriction where the shape of the head of the mushroom-shaped recess merges with the stalk.

The advantages of the invention include a comparatively highly favorable loading of the belt winding spindle, thus in turn increasing the strength of the apparatus as a whole. Moreover, there is a very short response time between the initiating moment, more particularly an accident, and the blocking of the safety belt, so that the wearer is restrained sufficiently in his or her seat, even with respect to the unavoidable expansion of the safety belt. Finally, in the event of a "tooth-to-tooth blocking" between the locking member and the teeth integral with the housing, which cannot be entirely ruled out, particularly favorable angular conditions between the spindle attachment and the locking member are obtained, so that a jamming of these two components is out of the question.

Figure 2:
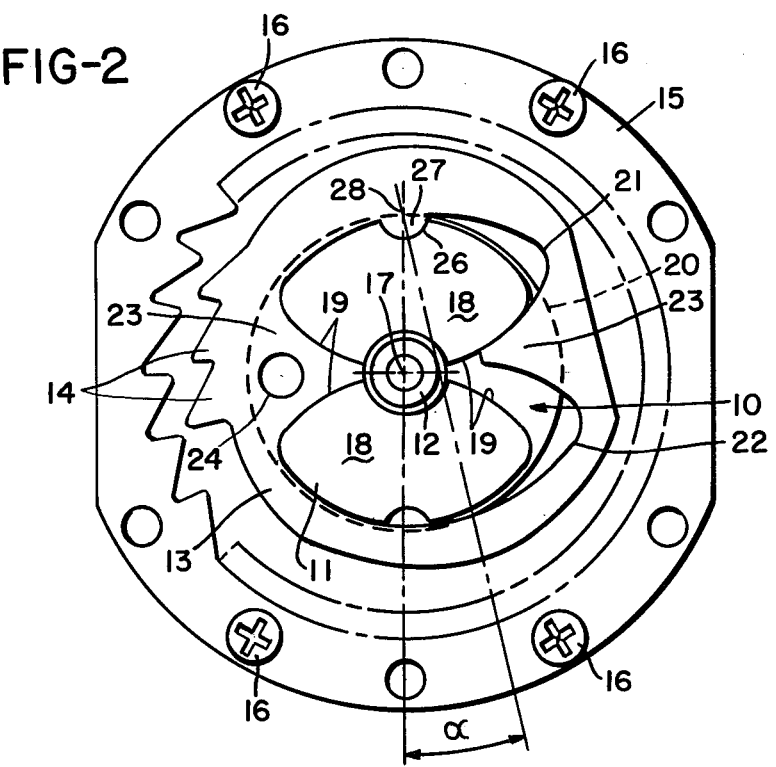
FIG. 2 is a view of the object in FIG. 1, in the released position.

Referring now to the drawings in detail, in the bel-treeling mechanism shown in FIGS. 1 and 2, a belt winding spindle 10 is mounted in a housing (not shown) of conventional design, particularly U-shaped. At one end, associated with the so-called system end, this spindle 10 has a specially profiled attachment 11. This attachment 11 may be formed in one piece from the blank for the spindle, for example by machining, or it may also be produced as a separate component and be secured to the end of the spindle, and it may also be made up of several components of the spindle 10 (see the embodiment shown in FIGS. 5 and 6). A pin 12 projects beyond the attachment 11 and serves to guide and hold additional components which are not shown.

A locking member 13 is movably mounted on the spindle attachment 11, and its three locking teeth 14 are capable of engaging, in conventional manner, in the inner teeth of a so-called thrust ring 15. The thrust ring 15 is secured to the corresponding side of the housing by means of screws 16. By being secured in this way, the thrust ring 15 forms stops, integral with the housing, for the locking member 13.

As shown in FIGS. 1 to 4, the spindle attachment 11 has a cross-sectional shape, relative to the axis 17 of the spindle, which can be termed essentially octagonal, the octagon comprising two ovals 18 arranged symmetrically with respect to the spindle axis 17. Consequently, the attachment 11 has a waist-like constriction in its transverse center, with the four flanks 19 thereof being symmetrically curved. This curvature corresponds to that of the outer edges of the ovals 18, which in turn corresponds to the curvature of the circumferential line 20 of the cross section of the spindle 10. In the symmetrical embodiment of the attachment 11 shown in FIGS. 1 to 4, this may also be termed butterfly-shaped.

The locking member 13 is an annular disc of irregular shape, stamped out of sheet metal, the central recess of which is also octagonal or butterfly-shaped or waisted and, as shown in FIGS. 1 to 4, comprises two oval structures, which are not exactly the same size but consist of a smaller oval recess 21 and a larger oval recess 22. Between these two, the recess of the locking member 13 has a waist-like constriction, i.e. the annular shape of the locking member 13 has inwardly directed projections 23, but the distance between the tips of these projections 23 is greater than the width of the waist-like constriction in the spindle attachment 11. In one projection 23 there is provided a hole 24, which serves to balance out the weight. The opposite side of the locking member 13 has a flattened portion 25 which serves a similar purpose. The locking teeth 14 are located in the region of the hole 24.

For movably mounting the locking member 13 on the attachment 11, the ovals 18 each have, at their apex, diametrically opposite one another, a small depression 26 substantially the size of one third of a circle, into which a suitably shaped bearing projection 27 fits in such a way that the locking member 13 can readily oscillate back and forth on the attachment 11. The limits of these oscillating movements are determined by the dimensions of the octagonal configurations of the ovals 18, 21, 22 of the attachment and the locking member. The dimensions are chosen so that the locking member 13, in its released position shown in FIG. 2, can rotate freely inside the inner teeth of the thrust ring 15, without coming into contact therewith, when the belt winding spindle 10 rotates, whereas in the blocked position shown in FIG. 1, it engages snugly with its teeth 14 in the thrust ring 15 in such a way that the associated surfaces of the ovals 18, 21, 22 abut on one another in a frictionally connected manner. For this purpose, the larger oval 22 of the recess must be correspondingly wider than the smaller oval 21 of the locking member 13, so that the intended oscillating movements can occur. The oscillating axis is in the center of the bearing projection 27; it forms the eccentric point 28 for the eccentrically mounted inertial locking member 13.

During normal operation of the belt reeling mechanism, in the released position, the parts occupy the position shown in FIG. 2. The belt (not shown) can be rolled up by the belt winding spindle 11 as necessary. A conventional spring (not shown) ensures that the locking member 13 remains in its released position in this operational state. If an accident or some other exceptional occurrence happens, the locking member 13 can move out of position, overcoming the spring force, and move into the blocking position shown in FIG. 1. The essential point, in order to achieve optimum safety, is that the transition from the released position to the blocked position should be as fast as possible. This is partly a matter of the distance which the locking member has to travel. On its way, the locking member passes through an angle alpha, described by the eccentric point 28; in the present case, this angle is relatively extremely small, since the eccentric point 28 is at a comparatively great distance x from the spindle axis 17, namely, in the embodiment shown in FIGS. 1 and 2, at the circumferential line of the belt winding spindle 10. The greater the spacing between the eccentric point 28 and the spindle axis 17, i.e. the greater the distance x, the smaller the angle alpha through which the locking member 13 has to pivot in order to move from the position shown in FIG. 2 to the position shown in FIG. 1. The converse of this is also true, namely a small angle alpha also permits rapid release of the belt reeling mechanism.

Figure 3:
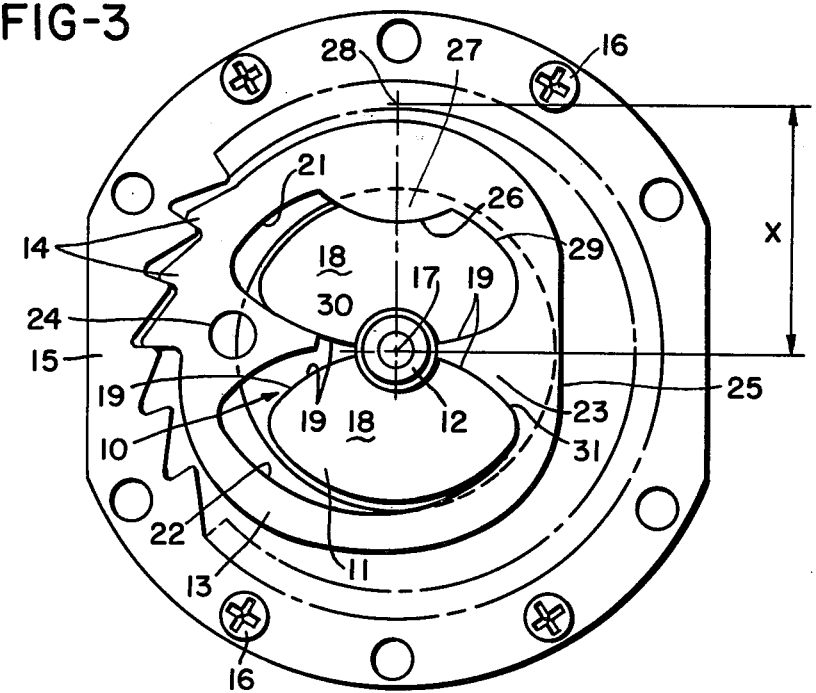
FIGS. 3 and 4 show a modified embodiment viewed according to FIGS. 1 and 2.
Figure 4:
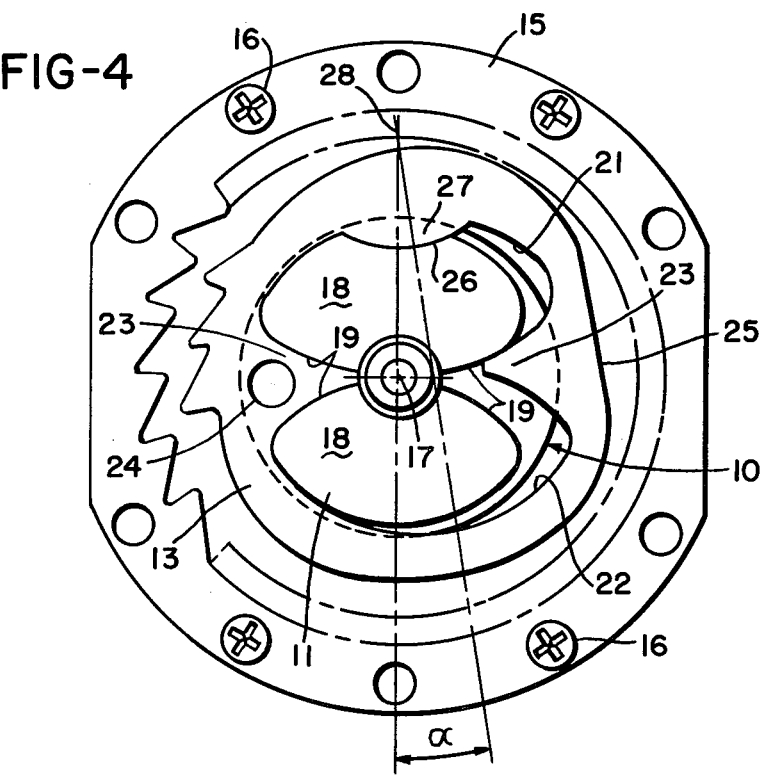

In the embodiment shown in FIGS. 3 and 4, the spacing x is particularly large, compared with the embodiment shown in FIGS. 1 and 2, so that the angle alpha is also particularly small. Here, the eccentric point 28 is located outside the circumferential line 20 of the spindle 10; this is made possible by the fact that the depression 26 and the bearing projection 27 have a comparatively very large radius. Otherwise, FIGS. 3 and 4 correspond to FIGS. 1 and 2, except that the spindle attachment 11 in the embodiment shown in FIGS. 3 and 4 has only one depression 26. If two depressions 26 are provided, as shown in FIGS. 1 and 2, the locking member 13 can be inserted in one position or the other during assembly, thus simplifying the process.

Due to the arrangement of the spindle attachment 11 and the locking member 13, three abutment surfaces 29, 30, 31 are produced under load as shown in FIGS. 1 and 3, by means of which the forces produced are advantageously transmitted from the belt through the spindle 10 with its attachment 11 and the locking member 13 to the thrust ring 15 and housing, and hence to the body of the vehicle; i.e., there are favorable load characteristics on the spindle 10, and the strength of the belt reeling mechanism is increased. The three abutment surfaces 29, 30, 31 are produced by the fact that the locking member 13 is guided only along circular paths which are located about the eccentric point 28 and determine the path of the flanks 19 of the ovals 18 and the corresponding flanks of the oval recesses 21, 22. The imaginary eccentric point located diametrically opposite the eccentric point 28 in FIGS. 1 and 3 should also be borne in mind. As a result, different configurations of the attachment and the recess in the locking member are possible, without affecting the objective of keeping the angle alpha as small as possible.

Figure 5:
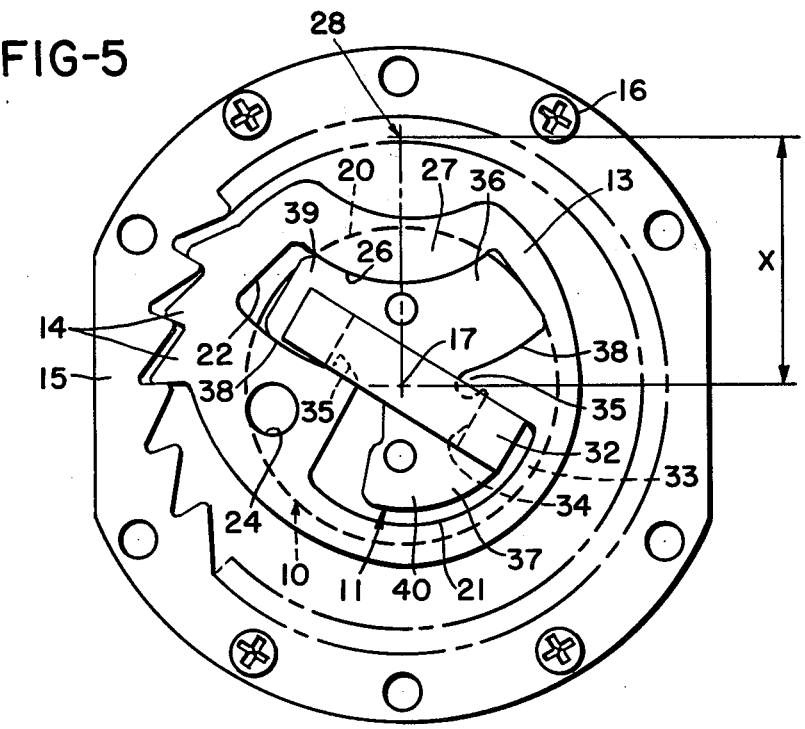
FIGS. 5 and 6 show a third embodiment, again modified, viewed according to FIGS. 1 and 2.
Figure 6:
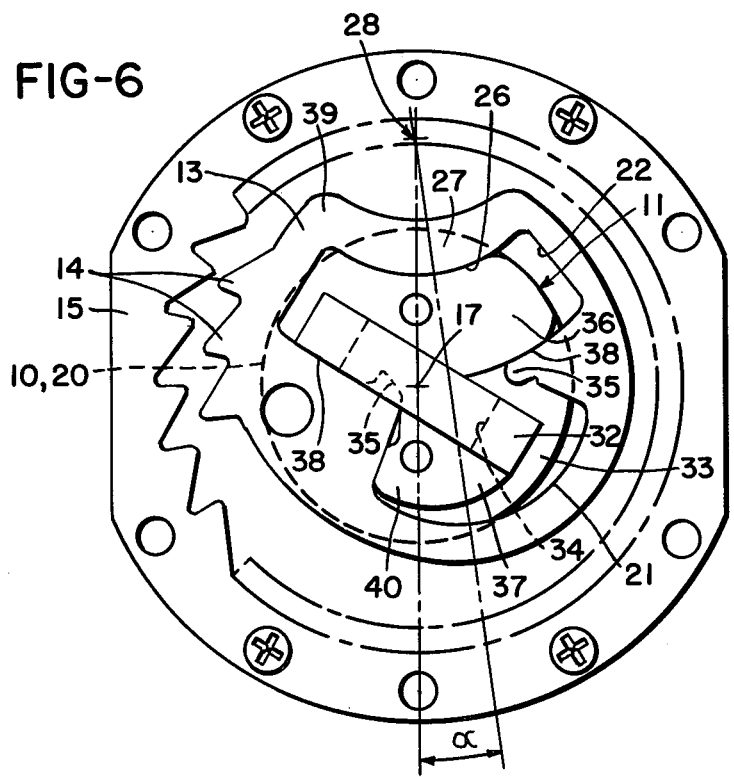

In the belt reeling mechanism according to FIGS. 5 and 6, a belt winding spindle 10 is also mounted in a housing (not shown). This spindle 10 has, at one end, a specially profiled attachment 11. This attachment comprises two parts, since in this exemplary embodiment the belt winding spindle 10 also consists primarily of two parts, namely a steel core 32 and a reel member 33. The steel core 32 is as long as the spindle 10, in the direction of the spindle axis 17, and, at right angles thereto, not quite as wide as the diameter of the reel member 33. The steel core is relatively flat and of an elongate rectangular shape. FIGS. 5 and 6 show views of the end face of the steel core 32. The reel member 33 essentially comprises a plastics cylinder which receives the steel core 32 in a diametrically central position, i.e. the plastics reel member 33 is injection molded around the steel core 32 during manufacture. The belt webbing (not shown) is wound onto the reel member 33 in a conventional manner, and for this purpose the reel member 33 also has a device (not shown) for securing the end of the belt webbing.

At the system end of the belt reeling mechanism shown in FIGS. 5 and 6, the steel core 32 of the spindle 10 projects somewhat beyond the end face of the reel member 33 and thus forms part of the spindle attachment 11. In the projecting part of the attachment, the steel core 32 has a slot-shaped perforation 34 in which the cams 35 (to be described hereinafter) on the locking member 13 can engage, in order to secure the locking member 13 in the direction of the spindle axis 17 against slipping off the spindle attachment 11.

The plastics reel member 33 also contributes, with its projecting portion, to the formation of the spindle attachment 11 at the system end of the apparatus, so as to produce a spindle attachment made of steel and plastics, on which the locking member 13 is mounted in order to perform its function. The steel core 32 takes over the job of transmitting the major forces in the locking position of the belt reeling mechanism, while the plastics part of the spindle attachment only has to act as a guide for the movements of the locking member. With this combination of components and materials, it is possible to arrive at the abovementioned advantages of the special construction of the spindle attachment 11 and the locking member 13, as described above, by means of a spindle of minimal weight.

The spindle attachment 11 made up of two materials as shown in FIGS. 5 and 6 has a construction which can be referred to as substantially mushroom-shaped, being made up of a mushroom head 36 and mushroom stalk 37, which extend on each side of the spindle axis 17. Consequently, the attachment 11 has a waist-like constriction in its transverse center, adjoining which are guide surfaces 38 symmetrically curved towards the mushroom head 36, which constitute a portion of a circle drawn about the eccentric point 28, so that the locking member 13 is guided on the circular path thus formed.

In this embodiment, as well, the locking member 13 is an irregularly shaped annular disc stamped out of sheet metal, the central recess of which is also approximately mushroom-shaped and consists of a smaller part 21 for the stalk of the mushroom and a larger part 22 for the mushroom head. Between these two, the recess in the locking member 13 is provided with a waist-like constriction, i.e. the annular shape of the locking member 13 has inwardly directed projections in the form of the cams 35 already mentioned, with the spacing between the tips of these cams 35 being greater than the width of the waist-like constriction of the spindle attachment 11. The cams 35 engage in the perforation 34 in the steel core 32, so that the locking member 13 cannot move out of its intended position on the attachment 11 towards the spindle axis 17. The engagement of the cam 35 shown on the left in FIGS. 5 and 6 is constantly maintained, while the cam 35 located on the right only moves into the perforation 34 when the locking member 13 is in the blocking position shown in FIG. 5, while in the released position shown in FIG. 6, in which only small forces can be expected, this cam moves out of the perforation 34.

For movably mounting the locking member 13 on the attachment 11, the mushroom head 36 comprises, on its top, a broad depression 26 which is a circle described about the eccentric point 28 and hence running parallel to the lower edge of the mushroom head which is in the form of a portion of a circle. A correspondingly wide bearing projection 27 of the locking member 13 fits into the depression 26 in such a way that the locking member 13 can readily slide back and forth on the mushroom head 36 of the attachment 11. The limits of these sliding movements are determined by the dimensions of the mushroom head and stalk of the attachment 11, and by the dimensions of the recess in the locking member 13. The dimensions are selected as described in connection with FIGS. 1 to 4, with the spacing x corresponding to that of the embodiment shown in FIGS. 3 and 4; i.e. it is particularly great, so that the angle alpha can be particularly small. The eccentric point 28 is located outside the circumferential line 20 of the spindle 10.

In operation, the belt reeling mechanism as shown in FIGS. 5 and 6 behaves in substantially the same way as the belt reeling mechanisms shown in FIGS. 1 to 4. In the released state shown in FIG. 6, the locking member 13 abuts with the upper part 22 of its recess on the plastics part 39 of the mushroom head 36, and with the lower part 21 of its recess on the plastics part 40 of the mushroom stalk 37, which is sufficient for the forces occurring under these conditions. On transition from the released to the blocked position, the locking member 13 moves from right to left, in FIG. 6, over the spindle attachment 11, until the position shown in FIG. 5 is reached. Thus, the mushroom-shaped attachment 11 in the recess 21, 22 of the locking member 13 pivots from left to right until it comes to rest at the other side. This means that the forces, which are substantially greater in the locking position, are now transmitted from the steel core 32 to the locking member 13 and hence to the thrust ring 15, while, as shown in FIG. 5, the steel core 32 presses downwards, in the top left, and presses upwards in the bottom right, thereby acting accordingly on the teeth 14, 15. Any parts of the spindle attachment 11 made of plastics remain virtually unaffected during this transmission of force, so that, on average, they cannot be damaged. If the belt reeling mechanism returns to the released position shown in FIG. 6, the plastics areas of the attachment 11 move back into the abutting position, thereby advantageously leading to a reduction in noise.

The present invention is, of course, in no way restricted to the specific disclosure of the specification and drawings, but also encompasses any modifications within the scope of the appended claims.

What is claimed is:

1. A self-locking belt reeling mechanism for buckle-on safety belts in passenger-carrying vehicles, said mechanism having a spindle which is mounted in a housing, is subjected to means exerting spring tension, and on which a belt can be rolled up, said housing being provided with first stops to arrest rotation of the spindle; said mechanism further comprising:

an inertial locking member eccentrically mounted on one end of said belt winding spindle about an eccentric point which is arranged at least on the circumferential line of said spindle; said locking member, in the event of a predetermined acceleration in the rotation of said spindle in the direction of unrolling of the belt, moving outwards and making contact with said first stops of said housing; said locking member having a curved recess and at least one second stop also to arrest rotational relative movement therewith; and an attachment provided on said one end of said belt winding spindle and engaging in said curved recess of said locking member, said attachment co-operating with said locking member during any relative movement between said spindle and said locking member; said attachment and said locking member having guide surfaces which are portions of circles drawn about said eccentric point and form circular paths, with said locking member being guided only along said circular paths, said attachment comprising two substantially oval parts of octagonal configuration mounted on each side of the axis of said spindle, with the circumferential surfaces of said oval part forming said circular paths; and in which said curved recess of said locking member fits over said attachment and its circular surfaces with the clearance required for the outwardly directed relative movement between said spindle and said locking member, with said eccentric mounting of said locking member being located in the region of an apex of one of said oval parts of said attachment.

2. A belt reeling mechanism according to claim 1, in which said attachment has a symmetrical butterfly-shaped configuration.

3. A belt reeling mechanism according to claim 2, in which said attachment has two apex points, and in which, at both of said apex points, said attachment is designed for selective mounting of said locking member.

4. A belt reeling mechanism according to claim 3, in which the spacing between said apex points of said attachment is substantially equal to the diameter of said spindle.

5. A belt reeling mechanism according to claim 3, in which said eccentric mounting of said locking member comprises a depression in said attachment, and a corresponding bearing projection on said locking member adjacent said curved recess thereof.

6. A self-locking belt reeling mechanism for buckle-on safety belts in passenger-carrying vehicles, said mechanism having a spindle which is mounted in a housing, is subjected to means exerting spring tension, and on which a belt can be rolled up, said housing being provided with first stops to arrest rotation of the spindle; said mechanism further comprising:

an inertial locking member eccentrically mounted on one end of said belt winding spindle about an eccentric point which is arranged at least on the circumferential line of said spindle; said locking member, in the event of a predetermined acceleration in the rotation of said spindle in the direction of unrolling of the belt, moving outwards and making contact with said first stops of said housing; said locking member having a curved recess and at least one second stop also to arrest rotational relative movement therewith; and an attachment provided on said one end of said belt winding spindle and engaging in said curved recess of said locking member, said attachment co-operating with said locking member during any relative movement between said spindle and said locking member; said attachment and said locking member having guide surfaces which are portions of circles drawn about said eccentric point and form circular paths, with said locking member being guided only along said circular paths, said spindle comprising a steel core having a flat rectangular cross section, and a reel member made of plastic and containing said steel core; and in which said attachment comprises a combination of portions of said steel core and the associated end face of said reel member, which together form said guide surfaces for forming the portions of circles drawn about said eccentric point.

7. A belt reeling mechanism according to claim 6, in which that portion of said attachment formed by said steel core cooperates with those parts of said curved recess of said locking member which, in the event of engagement of said locking member in said first stops of said housing, serve to transmit force from said spindle via said locking member to said first stops; and in which that portion of said attachment formed by said reel member cooperates with those parts of said curved recess of said locking member which are intended to guide said locking member in its outwardly directed relative movement and back again.

8. A belt reeling mechanism according to claim 7, in which said composite attachment is approximately mushroom-shaped, with the head of the mushroom being on one side of the axis of said spindle, and the stalk of the mushroom being on the other side of the axis of said spindle; in which said steel core extends diagonally from said mushroom head to said mushroom stalk while forming an outer edge on both said mushroom head and said mushroom stalk, with the circumferential surfaces of said mushroom head forming said circular paths; and in which said curved recess of said locking member fits over said attachment, with its mushroom head and stalk, with the clearance required for the outwardly directed relative movement.

9. A belt reeling mechanism according to claim 8, in which said eccentric mounting of said locking member comprises a depression in said mushroom head of said attachment, and a corresponding bearing projection on said locking member, adjacent said curved recess thereof, with said depression describing a circular line drawn about said eccentric point.

10. A belt reeling mechanism according to claim 8, in which said outer edge formed on said mushroom stalk by said steel core is a first abutment surface; in which a second abutment surface formed by said plastic reel member is provided on said mushroom head opposite said first abutment surface; and which includes a corresponding third abutment surface of said curved recess of said locking member which cooperates with said second abutment surface to limit the inwardly directed relative movement of said locking member.

11. A belt reeling mechanism according to claim 8, in which said steel core, in the area of mounting of said locking member on said attachment, is provided with at least one perforation; and which includes at least one cam on said locking member adjacent said curved recess thereof, said at least one cam engaging in said at least one perforation so as to prevent said locking member from moving in the direction of the axis of said spindle.

12. A belt reeling mechanism according to claim 11, which includes two cams arranged opposite one another on opposite sides of the axis of said spindle and engaging from opposite sides in said at least one perforation of said steel core.

13. A belt reeling mechanism according to claim 12, in which said curved recess of said locking member is also mushroom-shaped, forming a constriction where the head of the mushroom merges with the stalk of the mushroom, said two cams being provided at said constriction.

* * * * *